United States Patent [19]
Haferl

[11] Patent Number: 4,965,496
[45] Date of Patent: Oct. 23, 1990

[54] PROTECTION ARRANGEMENT OF A DEFLECTION CIRCUIT

[75] Inventor: Peter E. Haferl, Adliswil, Switzerland

[73] Assignee: RCA Licensing Corporation, Princeton, N.J.

[21] Appl. No.: 315,087

[22] Filed: Feb. 24, 1989

[30] Foreign Application Priority Data
Oct. 3, 1988 [GB] United Kingdom ............... 8805757
Oct. 3, 1988 [GB] United Kingdom ............... 8805758

[51] Int. Cl.5 ..................... H01J 29/56; H01J 29/70
[52] U.S. Cl. ................................... 315/371; 315/408
[58] Field of Search ..................... 315/370, 371, 408

[56] References Cited

U.S. PATENT DOCUMENTS

| | | | |
|---|---|---|---|
| 3,444,424 | 5/1969 | Ushikubo et al. | 315/408 |
| 4,206,388 | 6/1980 | Ishigaki et al. | 315/371 |
| 4,321,513 | 3/1982 | Knight | 315/411 |
| 4,329,729 | 5/1982 | Knight | 315/399 |
| 4,429,257 | 1/1984 | Haferl | 315/371 |
| 4,459,517 | 7/1984 | Hicks | 315/408 |
| 4,532,457 | 7/1985 | Haferl | 315/411 |
| 4,565,949 | 1/1986 | Haferl | 315/371 |
| 4,625,154 | 11/1986 | Willis | 315/371 |
| 4,634,937 | 1/1987 | Haferl | 315/371 |
| 4,719,392 | 1/1988 | Haferl | 315/371 |
| 4,733,141 | 3/1988 | Watanuki | 315/371 |
| 4,780,648 | 10/1988 | Haferl | 315/371 |
| 4,794,307 | 12/1988 | Haferl | 315/371 |

OTHER PUBLICATIONS

U.S. Patent Application, RCA Docket No. 85,011, entitled Raster Distortion Corrected Deflection Circuit, filed concurrently herewith.

*Primary Examiner*—Gregory C. Issing
*Attorney, Agent, or Firm*—Joseph S. Tipoli; Joseph J. Laks; Sammy S. Henig

[57] ABSTRACT

A deflection switch of a horizontal deflection circuit is coupled to a retrace resonant circuit that includes a horizontal deflection winding and a first retrace capacitance. A flyback transformer primary winding is coupled to a junction terminal of the deflection switch and the resonance circuit. An East-West modulation current is generated by a bidirectional second switch having a conduction time that is phase modulated during horizontal retrace at a vertical rate in a parabolic manner. The second switch is coupled in series with the first switch during the entire trace interval. To prevent an over-current condition when the current in the second switch exceeds a predetermined first level, the second switch is turned off and interrupts the flow of current through the deflection switch. Additionally, a diode is coupled between an intermediate terminal of the transformer primary winding and a junction terminal of the deflection and the second switches for preventing an overvoltage condition from developing across the second switch.

18 Claims, 3 Drawing Sheets

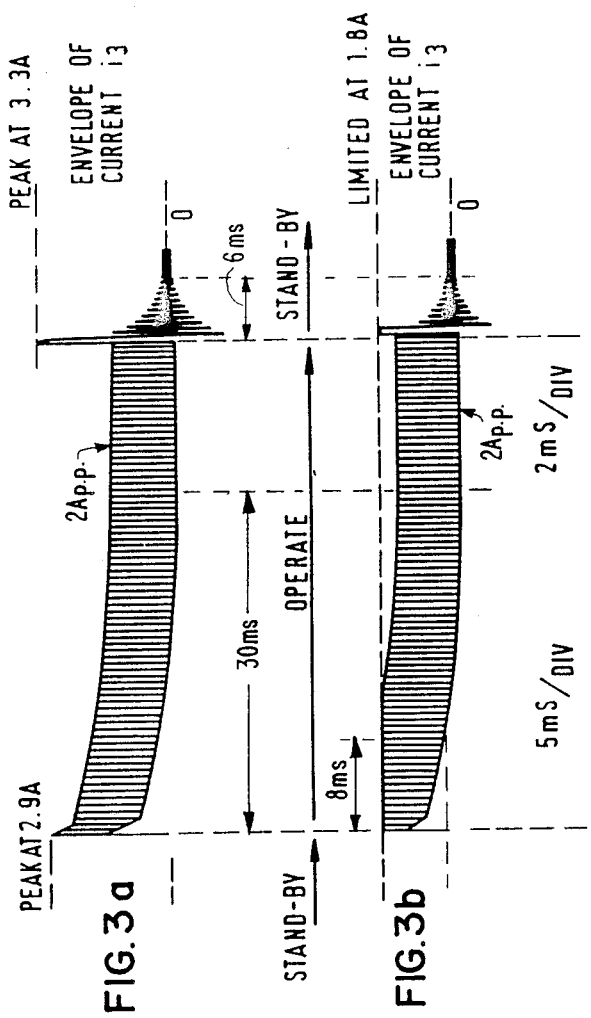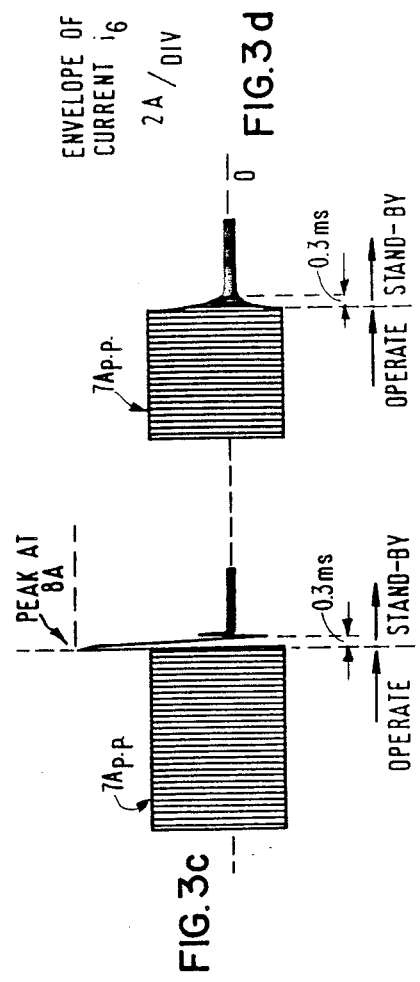

PROTECTION ARRANGEMENT OF A DEFLECTION CIRCUIT

This invention relates to a protection apparatus a deflection circuit.

The invention may be utilized in, for example, a deflection circuit in which the amplitude of a deflection current may be varied or modulated over a relatively wide range for correcting a raster distortion. Modulation of the deflection current amplitude may be desirable for purposes such as, for example, correction of outside and of inside east-west pincushion distortion.

Typically, the horizontal deflection circuit encompasses an output stage that includes a deflection first switch, a horizontal deflection winding and a trace capacitance that supplies deflection current to the deflection winding during each trace interval. A first retrace capacitance is coupled across the deflection winding during the retrace interval to form a retrace resonant circuit. Energy is replenished during retrace via a flyback transformer.

In a horizontal deflection circuit, embodying an aspect of the invention, a modulation switching current is formed by the operation of a bidirectional modulation second switch, during retrace. The modulation second switch, coupled to the retrace resonant circuit that includes the first retrace capacitance, has a conduction time that is phase modulated during horizontal retrace in accordance with a vertical rate parabolic voltage. A second retrace capacitor is coupled in parallel with the modulation second switch. The modulation second switch is conductive during the trace interval and is turned-off at a controllable instant during retrace. The modulation second switch forms, when conductive, a low impedance across the second retrace capacitor that clamps the voltage across the second retrace capacitor to zero. As a result, a controllable retrace pulse voltage having an amplitude that is controllable and a width that is variable is developed across the second retrace capacitor when the modulation second switch during a portion of retrace is nonconductive. The retrace voltage across the second retrace capacitor varies the magnitude of a retrace voltage that is developed across the first retrace capacitor and, in this way, provides the desired deflection winding current modulation so as to correct for outside and inside pincushion distortion.

The first and second switches may be formed by first and second transistor switches, respectively, that are coupled in series during a portion of given deflection cycle. It may be desirable to protect the first and second transistor switches against an over-current condition. It may also be desirable to protect the first and second transistor switches against an over voltage condition.

A television deflection apparatus, embodying a feature of the invention, includes a deflection resonant circuit that includes a deflection winding and a retrace capacitance. A source of an input first signal at a frequency that is related to a first deflection frequency is provided. A first transistor operating as a switch and being responsive to the input first signal and being coupled to the deflection resonant circuit is used for generating a deflection current in the deflection winding at the first deflection frequency. A second transistor operating as a switch is coupled to the resonant circuit and to the first transistor switch such that during a given deflection cycle the first and the second transistors are conductive and coupled in series. A source of an input supply voltage is coupled to the first and second transistor switches for generating a current that flows through both the first and second transistor switches when both the first and second transistor switches are conductive and coupled in series. A source of a modulation second signal is coupled to the second transistor for modulating conduction thereof in accordance with the second signal. A control signal that is coupled to a control terminal of the second transistor switch is generated. The control signal substantially reduces the flow of the current through the first and second transistor switches when the control signal is generated.

In accordance with another feature of the invention, a switching arrangement is coupled to a terminal that is coupled between the first and second transistor switches to provide an over-voltage protection.

FIGS. 3a–3d illustrate waveforms useful in explaining a current protection feature of the circuit of FIG. 2.

Figure 2:
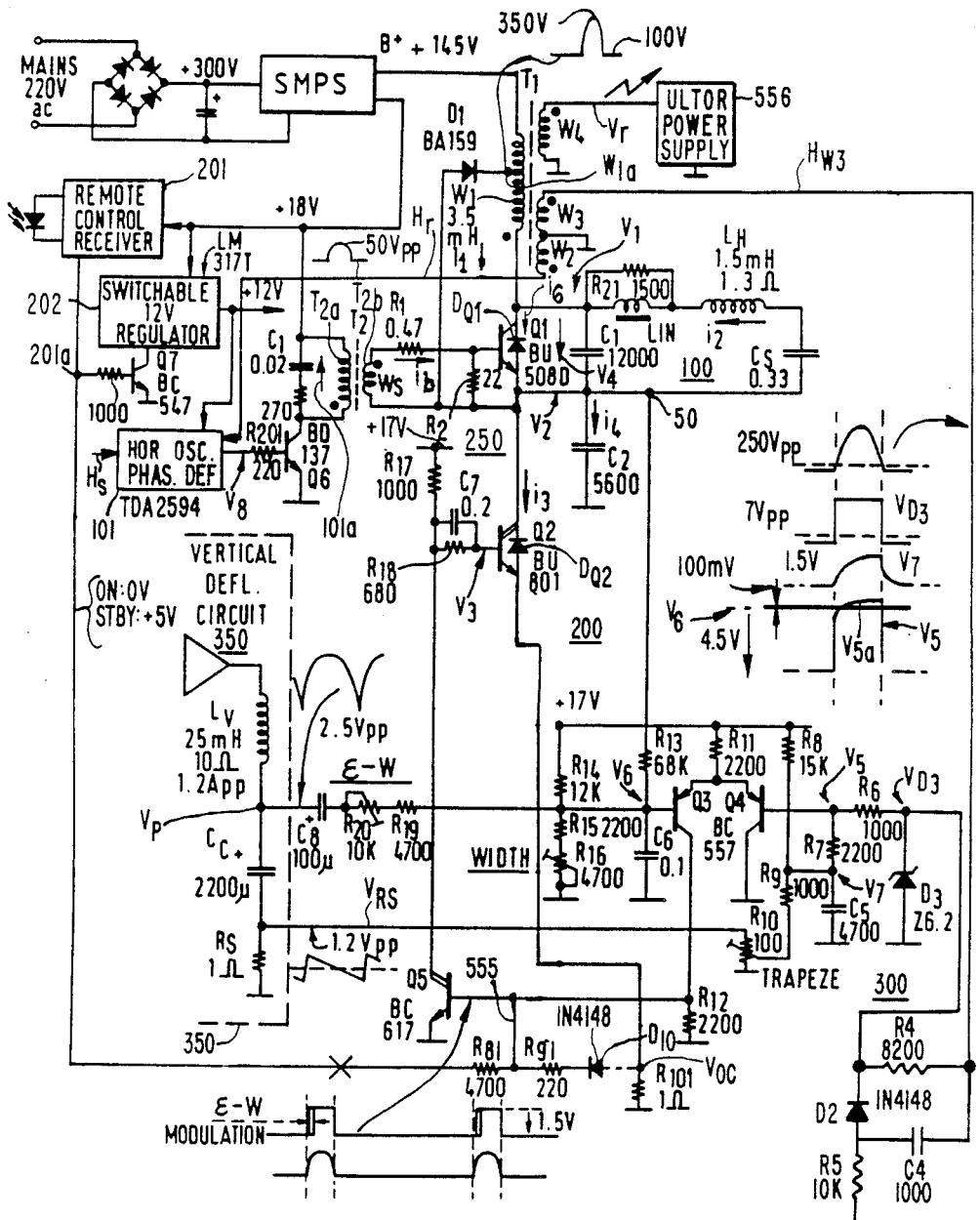
FIG. 2 illustrates a deflection circuit, embodying an aspect of the invention, that includes outside pincushion correction arrangement.

A horizontal deflection circuit 250 of FIG. 2, embodying an aspect of the invention, provides horizontal deflection in, for example, an FS color cathode ray tube (CRT) type A66EAS00X01. Circuit 250 includes a switching transistor Q1 operating at a horizontal frequency $f_H$ and an anti-parallel damper diode $D_{Q1}$, both being constructed as one integrated circuit. A retrace capacitance C1 is coupled in parallel with transistor Q1 and diode $D_{Q1}$. A deflection winding $L_H$ is coupled in series with an S-shaping trace capacitance $C_s$ to form a circuit branch that is coupled in parallel with each of transistor Q1, diode $D_{Q1}$ and retrace capacitance C1 to form a retrace resonant circuit 100 during horizontal retrace.

A phase-control stage 101 that includes a horizontal oscillator and a phase detector, not shown in detail in FIGURES, is responsive to a horizontal synchronizing signal $H_s$. Signal $H_s$ is derived from, for example, a video detector of a television receiver, not shown in the FIGURES. Stage 101 applies, via a transistor Q6, a drive voltage 101a to a primary winding $T_{2a}$ of a driver transformer T2 that is transformer coupled to a secondary winding $T_{2b}$ of transformer T2. Winding $T_{2b}$ is coupled via a voltage divider, that includes resistors R1 and R2, to the base-emitter junction of transistor Q1 for producing a base drive current $i_b$ at the horizontal frequency $f_H$. A primary winding $W_1$ of a flyback transformer T1 is coupled between a source of a B+ voltage and the collector of transistor Q1. A secondary winding $W_2$ of transformer T1 is coupled to stage 101 to provide a feedback retrace signal $H_r$ for generating drive voltage 101a that synchronizes a horizontal deflection current $i_2$ in winding $L_H$ to signal $H_s$.

A switched raster correction circuit 200, embodying a feature of the invention, includes an E-W control circuit 300 that controls the switching timing of a switching transistor Q2. Transistor Q2 is conductive throughout the trace interval and becomes nonconductive during a controllable instant within the retrace interval. The collector of transistor Q2 is coupled to a junction terminal 50 between the emitter of transistor Q1 and retrace capacitor C1. The emitter of transistor Q2 is coupled to ground via a small current sampling resistor R101. A damper diode $D_{Q2}$, coupled in parallel with transistor Q2 is constructed with transistor Q2 as one integrated circuit. A second retrace capacitor C2 is coupled between the collector of transistor Q2 and the ground conductor. A retrace voltage $V_r$ generated across a winding W4 of transformer T1 provides a high voltage, used for generating an ultor voltage in an ultor power supply 556 that includes rectifying diodes, not shown in the FIGURES.

A first hypothetical example that is used for explanation purpose represents a first extreme operating condition in which transistor Q2 is maintained conductive throughout trace and retrace. In this case, deflection circuit 250 generates deflection current $i_2$ in a manner that is well known but without East-West correction. As explained later on, current $i_2$ is at a maximum peak-to-peak amplitude, in this case.

A second hypothetical example that is also used for explanation purposes, represents a second extreme operating condition in which switching transistor Q2 is in cutoff throughout an entire retrace interval. In the second example, during retrace, a pair of resonant circuits are formed. The first one, retrace circuit 100 of FIG. 2, includes retrace capacitor C1, winding $L_H$ and trace capacitor $C_S$. The second resonant circuit includes flyback transformer winding W1 and retrace capacitor C2 that are coupled in series. Considered separately, each of the pair of retrace resonant circuits is tuned to a frequency that is lower than a required nominal retrace frequency. The resonant circuits are coupled to form a combined resonant circuit. Therefore, the resulting common retrace frequency of the combined resonant circuit is higher than each of its constituents and is made equal to the required nominal retrace frequency that is, illustratively, 43 KHz in the PAL system.

As explained before, secondary winding W2 of transformer T1 provides horizontal synchronizing retrace signal $H_r$. Each pulse of signal $H_r$ represents the retrace interval in deflection winding $L_H$. Horizontal synchronizing signal $H_r$ is coupled to phase-control-stage 101 for providing feedback synchronization information. The synchronization information contained in the pulses of signal $H_r$ is indicative of the phase of current $i_2$ in deflection winding $L_H$. Signal $H_r$ and horizontal sync pulses $H_s$ are used to adjust the phase and the frequency of the horizontal oscillator output signal that is included in stage 101.

In the second hypothetical example, primary winding W1 of transformer T1 is coupled to retrace resonant circuit 100 through a capacitive voltage divider that includes capacitors C1 and C2 to form the combined resonant circuit. The combined retrace resonant circuit enables proper synchronization without causing mouseteeth distortion. The advantages of forming such combined retrace resonant circuit are explained in detail in U.S. Pat. No. 4,634,937 in the name of P.E. Haferl, the current Applicant, entitled "EAST-WEST CORRECTION CIRCUIT" and incorporated by reference herein.

During trace, current $i_1$ in winding W1 flows through transistor Q1 and through transistor Q2 to ground. During retrace, current $i_1$ that flows through capacitor C1 also flows through capacitor C2 as retrace current $i_4$ and causes a retrace voltage $V_2$ to be developed across retrace capacitor C2.

The amplitude of a retrace voltage $V_1$, developed across the series coupled capacitor C1 and C2 is stabilized by the B+ voltage that is regulated. Therefore, voltage $V_1$ is, advantageously, substantially unaffected by the East-West modulation. Retrace voltage $V_4$, developed across winding $L_H$ and across capacitor C1, determines the amplitude of deflection current $i_2$. Retrace voltage $V_4$ is equal to retrace voltage $V_1$ minus retrace voltage $V_2$. Because current $i_3$ in transistor Q2 is zero during the second portion of retrace when transistor Q2 is nonconductive, retrace current $i_1$ flows substantially entirely as current $i_4$ through capacitor C2 and generates retrace voltage $V_2$. It follows that in the second hypothetical example in which transistor Q2 is nonconductive throughout retrace, voltage $V_2$ is at a maximum amplitude. Consequently, voltage $V_4$ amplitude is at a minimum and deflection current $i_2$ is also at a minimum in the second hypothetical example.

Modulation of deflection current is obtained by a modulation of the turn-off instant of transistor Q2 during the first half of the retrace interval in a way that mouseteeth distortions are reduced. By selecting the value of capacitor C1 to be, for example, approximately twice that of capacitor C2 and the value of the inductance of winding W1 to be approximately twice that of winding $L_H$, the retrace frequency remains the same during both the first portion of retrace, when transistor Q2 is conductive, and during the second portion of retrace, when transistor Q2 is nonconductive. Consequently, the phase of voltage $V_1$ in winding W1 relative to that of deflection current $i_2$ is unaffected by the conduction state of transistor Q2. Modulation of the turn-off instant is permissible because both the retrace time and a retrace voltage $V_r$ developed from voltage $V_1$ in winding W4 of transformer T1 are, advantageously, substantially unaffected by the state of conductance of transistor Q2, during retrace.

FIGS. 1a–1h illustrate idealized waveforms useful for explaining the operation of the circuit of FIG. 2. Similar symbols and numerals in FIGS. 2 and in FIGS. 1a–1h indicate similar items or functions.

E-W control circuit 300 of FIG. 2 generates a pulsed voltage $V_3$ which drives the base of transistor Q2. Voltage $V_3$ causes transistor Q2 to be conductive throughout the trace interval. During retrace, the falling edge of voltage $V_3$ is phase modulated in the range $t_2$–$t_3$ of FIG. 1a. Thus, switching transistor Q2 of FIG. 2 is conductive prior to time $t_2$ of FIG. 1a and switched into cut-off after time $t_2$ at the phase modulated instant within the range $t_2$–$t_3$. When conductive, transistor Q2 clamps retrace voltage $V_2$ to zero and varies the instant when the generation of voltage $V_2$ occurs.

Current $i_1$ in winding W1 of transformer T1 of FIG. 2 flows into resonant circuit 100 that includes winding $L_H$ and capacitor C1. From resonant circuit 100, current $i_1$ splits and forms current $i_3$ and current $i_4$ when transistor Q2 of FIG. 2 is nonconductive. When transistor Q2 is turned-off, the decreasing current $i_4$ of FIG. 1d charges capacitor C2 of FIG. 2 until time $t_4$ of FIG. 1d, occuring at the center of the retrace interval when currents $i_1$ and $i_4$ become zero. As a result, voltage $V_2$ of FIG. 1e reaches its peak amplitude at the center of retrace. During the second half of retrace, negative current $i_4$ of FIG. 1d, that becomes increasingly more negative, discharges capacitor C2 of FIG. 2 until voltage $V_2$ becomes negative. When voltage $V_2$ becomes sufficiently negative, diode $D_{Q2}$ starts conducting and clamps voltage $V_2$ to $-0.6$ voltage, the forward voltage of diode $D_{Q2}$.

Figure 1:
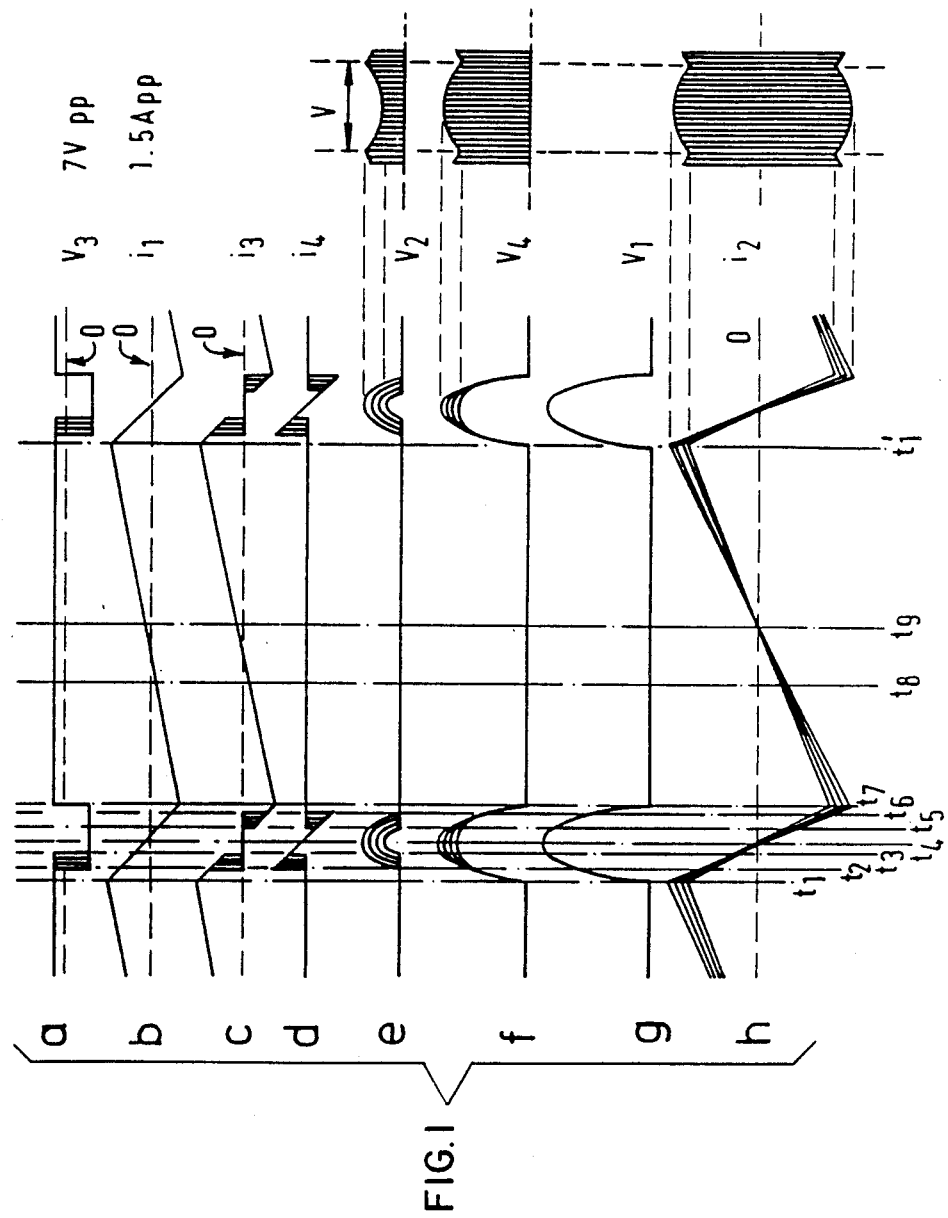
FIGS. 1a–1h illustrate idealized waveforms useful in explaining the circuit of FIG. 2.

The correction of outside pincushion distortion requires a higher amplitude of deflection current $i_2$ when scanning lines at the center of the raster than at the top or bottom. At the top of the raster, transistor Q2 is turned off at time $t_2$ of FIG. 1a, that is the earliest. Voltage $V_2$ of FIG. 1e starts to increase after time $t_2$. After the center of retrace occurs, voltage $V_2$ decreases until it becomes zero at time $t_6$. Because transistor Q2 is turned off at the time $t_2$ at the top of the raster, the peak amplitude of voltage $V_2$ is at a maximum; consequently, the peak amplitude of voltage $V_4$ of FIG. 1f is at a minimum. From the top toward the center of the raster, the turn-off time of transistor Q2, determined by the falling edge of voltage $V_3$ of FIG. 1a, is increasingly delayed within interval $t_2$-$t_3$. The result is a decreasing peak amplitude of voltage $V_2$ of FIG. 2, an increasing peak amplitude of voltage $V_4$ and an increasing peak amplitude of deflection current $i_2$. At the center of the raster, voltage $V_2$ starts increasing at time $t_3$ of FIG. 1e and becomes zero at time $t_5$ of each horizontal period. From the center toward the bottom of the raster, the turn-off time of transistor Q2 of FIG. 2 is increasingly advanced from time $t_3$ to time $t_2$ of FIG. 1a, resulting in an increasing voltage $V_2$ of FIG. 2, a decreasing voltage $V_4$ and a decreasing deflection current $i_2$. Thus, deflection current $i_2$ is proportional to retrace voltage $V_4$ and inversely proportional to retrace voltage $V_2$ that is modulated in accordance with the turn-off instant of transistor Q2.

The falling edge of voltage $V_3$ of FIG. 1a is phase modulated in a parabolic manner at a vertical rate to obtain the vertical rate envelopes shown in conjunction with waveforms 1e, 1f and 1h. Advantageously, the variation of the turn-off time of transistor Q2 of FIG. 2 modulates also the time when voltage $V_2$ of FIG. 1e becomes zero near the end of retrace.

The center of the retrace pulse waveform of voltage $V_2$ during horizontal retrace is maintained the same relative to the center of horizontal retrace time $t_4$ throughout vertical scan. Thus, voltages $V_4$ and $V_2$ of FIG. 2 are maintained in phase with respect to voltage $V_1$. It follows that, advantageously, signal $H_r$ is maintained in phase with deflection current $i_2$.

Signal $H_r$ developed across winding $W_2$ provides phase information of the phase of deflection current $i_2$. Signal $H_r$ is applied to stage 101 for synchronizing the horizontal oscillator of stage 101 to sync pulses $H_s$ of the video signal. Because capacitor C2 couples winding $W_1$ to winding $L_H$ to form a combined resonant circuit, the phase information of signal $H_r$ is substantially identical to that of deflection current $i_2$. Further advantage provided by the switched operation of transistor Q2 is that inductive components are not required to be coupled in series with transistor Q2. Also, the switched operation of transistor Q2 results in low power dissipation in transistor Q2. Therefore, transistor Q2 may not require a heat sink. An additional advantage over other east-west circuits such as a conventional diode modulator is that deflection current $i_2$ does not flow through a damper diode during the second half of trace, resulting in lower deflection losses and lower asymmetric linearity error.

As explained before, during retrace, deflection resonant circuit 100 is coupled to flyback transformer T1 by capacitor C2 having a high impedance, after transistor Q2 becomes nonconductive. When transistor Q2 becomes nonconductive, the ultor voltage rectifying diodes, not shown, are conducting. The high impedance of capacitor C2 substantially isolates windings $L_H$ and $W_1$ at frequencies associated with mouseteeth distortion that are substantially lower than the retrace frequency of resonant circuit 100 during retrace; thereby, raster distortions known as mouseteeth are prevented from occurring. The manner by which mouseteeth are prevented is further explained in a U.S. Patent Application that is filed concurrently herewith in the name of the same Applicant, RCA Docket No. 85,011, entitled, RASTER DISTORTION CORRECTED DEFLECTION CIRCUIT (the Haferl Patent Application), that is incorporated by reference herein.

Junction terminal 50 between capacitors C1 and C2 is clamped to ground potential by transistor Q2 during the entire trace interval. Therefore, raster disturbances referred to as "Organ Pipes" do not appear. Organ Pipes type raster disturbances may occur if such clamping were not used as a result of oscillatory current or ringings in the flyback transformer primary current. Such ringings are suppressed because transistor Q1 is clamped to ground by transistor Q2 during the entire trace interval.

Advantageously, damper diodes $D_{Q1}$ and $D_{Q2}$ may be constructed with the corresponding transistor using the integrated circuit technology for further reducing the required discrete components count.

E-W control circuit 300 of FIG. 2 includes a differential amplifier formed by transistors Q3 and Q4 and Darlington driver transistor Q5 which drives switching transistor Q2. The differential amplifier that includes transistors Q3 and Q4 compares a vertical parabola voltage $V_6$ to an exponentially shaped ramp portion $V_{5a}$ of a voltage $V_5$ having a waveform that is shown in FIG. 2. The crossover points of the compared voltages determines the timing of control voltage $V_3$ of FIG. 1a.

To develop voltage $V_5$ of FIG. 2, horizontal retrace pulses $H_{w3}$ of FIG. 2, developed in a winding $W_3$ of transformer T1, are coupled via a resistor R4 to a zener diode D3. A speed-up network that includes a capacitor C4, a resistor R5 and a diode D2 generates a gating pulse $V_{D3}$ across diode D3 having a leading edge with a fast rise time. Faster leading edge results, advantageously, in a larger dynamic range of E-W control circuit 300. Pulse $V_{D3}$ across diode D3 is applied via resistors R6 and R7 to a capacitor C5 and to a resistor R9 for generating the exponentially shaped ramp portion $V_{5a}$ of voltage $V_5$. Pulsed voltage $V_5$ that includes exponentially increasing top portion $V_{5a}$ is applied to the base of transistor Q4. A vertical rate parabolic voltage $V_p$ of FIG. 2 that includes a superimposed sawtooth voltage is coupled from a DC blocking capacitor $C_c$ of a conventional vertical deflection circuit 350 to the base of transistor Q3 via a capacitor C8, a resistor R20 and a resistor R19. Resistors R14, R15 and R16 provide dc bias to the base of transistor Q3. Voltage $V_2$ that is coupled via a resistor R13 to the base of transistor Q3 and to an integrating capacitor C6 provides a negative feedback, causing the vertical rate envelope of voltage $V_2$ to track parabolic voltage $V_p$ that is developed in capacitor $C_c$.

A vertical sawtooth voltage $V_{RS}$ developed across a sampling resistor $R_s$ is coupled, via a resistor R10 and a resistor R9, to a capacitor C5 for developing a voltage $V_7$ having an exponential upramping portion at a peak amplitude that is determined by voltage $V_{RS}$. Voltage $V_7$ is coupled to the base of transistor Q4 of control circuit 300. In this way, Volta $V_{RS}$ is also coupled via capacitor $C_c$ to the base of transistor Q3. Because volta $V_{RS}$ is applied in a differential manner, voltage $V_{RS}$ is prevented from substantially affecting the switching operation of transistors Q3 and Q4. A vertical parabola voltage $V_6$ developed at the base of transistor Q3 is compared to horizontal ramp voltage $V_5$. The crossover points of voltages $V_5$ and $V_6$ determine the timing of the leading and trailing edges of voltage $V_3$, as indicated before.

Exponentially shaped ramp portion $V_{5a}$ of voltage $V_5$ linearizes the east-west modulator circuit 200 by compensating for the decreasing level of current $i_1$ of FIG. 1b, during retrace. Linearization occurs because a small amount of modulation of voltage $V_3$ near time $t_2$ of FIG. 1a results in a higher amplitude modulation of voltage $V_2$ of FIG. 1e than the same amount of modulation of voltage $V_3$ near time $t_3$ of FIG. 1a. This is so because the amplitude of each of currents $i_1$ and $i_4$ of FIGS. 1b and 1d, respectively, is higher at time $t_2$ than at time $t_3$ and because voltage $V_2$ is proportional to the value of $\int i_4 \cdot dt$. The exponentially shape ramp voltage $V_5$ is steeper near time $t_2$ than at time $t_3$ of FIG. 1g. Consequently, for a given voltage variation at the base of transistor Q3, the the modulation of voltage $V_3$ is smaller around time $t_2$ than around time $t_3$. Thus the exponentially shaped ramp portion $V_{5a}$ of voltage $V_5$ linearizes the operation of E-W raster correction circuit 200. Resistor R15 raises the dc average of voltage $V_5$. Compensation of picture width variations as a function of beam current, that may be referred to as anti-breathing, may be applied via the base of transistor Q3.

Transistor Q5 of FIG. 2, having a base that is coupled to the junction of a load resistor R12 and a collector of transistor Q3, applies a base drive to transistor Q2 from a load resistor R17 that is coupled to the collector of transistor Q5. The collector of transistor Q5 is coupled via a parallel arrangement of a capacitor C7 and a resistor R18 for generating a fast transition of a falling edge portion of voltage $V_3$ to obtain a fast turn-off of transistor Q2. The fast turn-off allows interrupting current $i_3$ immediately after time $t_1$ of FIG. 1c and allows using the full modulation range between time $t_1$ and $t_4$. Illustratively, the turn-off delay of transistor Q2 of FIG. 2 is less than 1 microsecond. The use of a MOSFET in place of Q2 may further reduce the turn-off delay. The fast turn-off feature may be desirable in a situation that requires a deflection current at, for example, a higher frequency such as $2xf_H$.

A protection diode D1, embodying a feature of the invention, is coupled between the collector of transistor Q2 and a terminal W1a of primary winding $W_1$ of transformer T1. Diode D1 protects transistor Q2 from excessive peak voltage that may occur when power is initially turned on. Transistor Q2 is protected by diode D1 which limits voltage $V_2$ to a maximum of 350V. Transformer T2 has, preferably, 400V isolation capability between the primary and secondary windings.

A remote control receiver 201 generates an on/off control signal 201a that is coupled to an on/off transistor switch Q7 of a +12V regulator. When transistor Q7 is nonconductive, an output supply voltage +12V is generated that causes phase-control-stage 101 to be energized during power-up. When transistor Q7 is conductive, stage 101 is de-energized that causes stand-by mode operation. During a transition to the stand-by mode, phase-control-stage 101 that supplies base drive to the base of transistor Q6 causes driver transistor Q6 of transformer T2 to be turned-off.

After, for example, the transition from normal operation to the stand-by mode operation, there may still be energy stored in primary winding $T_{2a}$ of transformer T2 of FIG. 2. This energy may continue producing base current $i_b$ in deflection transistor Q1 until a magnitude of voltage 101a across primary winding $T_{2a}$ of transformer T2 decreases to zero. As a result, a final deflection cycle may be generated with an extended but undefined time duration that ends when transistor Q1 ceases to conduct. Consequently, currents $i_1$, $i_2$ and $i_3$ might increase excessively and destroy transistors Q1 and Q2.

In accordance with another feature of the invention, to prevent such a possibility, on/off control signal 201a is coupled through a resistor R81 and a conductor 555 to the base electrode of a transistor Q5 that provides base drive to transistor Q2, causing transistor Q2 to turn off immediately after the power-on-to-standby transition. Since both transistors Q1 and Q2 are coupled in series, turning off transistor Q2 causes the current in both transistors to cease. Thus transistors Q1 and Q2 are protected. However, such fast shut-down arrangement may require a fast spot suppression circuit to prevent a beam spot related damage to the CRT, not shown.

In an alternative protection arrangement, embodying a further feature of the invention, in which the aforementioned fast spot suppression circuit, advantageously, may not be required is also shown in FIG. 2. In such preferred arrangement, a feedback arrangement that includes a series arrangement of a diode D10 and a resistor R91 is coupled between the emitter of transistor Q2, as shown by the dashed line, and the base of transistor Q5, via conductor 555. When such feedback arrangement is used, the emitter of transistor Q2 is coupled to ground via current sampling resistor R101 causing current $i_3$ to be sampled across resistor R101. A resulting voltage $V_{oc}$ developed across resistor R101 controls the base voltage of transistor Q5. When voltage $V_{oc}$ across resistor R101 exceeds +1.8V, transistor Q5 is turned on by voltage $V_{oc}$ and reduces the base drive of transistor Q2. Thus, current $i_3$ is limited to a peak of 1.8 ampere when, for example, resistor R101 equals 1 ohm.

The feedback provided by diode D10 and resistor R91, advantageously, protects both transistors Q1 and Q2 that are coupled in series during operation and, in particular, during the power-up-to-standby &transition. It should be understood that such feedback arrangement may also be used together with, or instead of the arrangement in which signal 201a is coupled to the base of transistor Q5 that was explained before. When, for example, both arrangements are used together, current $i_3$ may become substantially reduced to, for example, zero for providing the required protection over-current or for providing on/off operation.

FIG. 3a illustrates an envelope of a waveform of current $i_3$ of FIG. 2 immediately after corresponding transitions between normal operation power-up mode and standby mode without the protection circuit, that would occur if conductor 555 were disconnected for disabling the operation of the protection circuit. Similarly, FIG. 3b illustrates the envelope of the waveform of current $i_3$ of FIG. 2 when conductor 555 is connected that enables the operation of the protection circuit. Note that current $i_3$ of FIG. 3b is limited to the maximum of 1.8 amperes. Likewise, FIG. 3c illustrates an envelope of collector current $i_6$ of Q1 of FIG. 2 when the protection circuit is disabled and FIG. 3d illustrates the envelope of current $i_6$ of FIG. 2 when the protection circuit is enabled.

What is claimed is:
1. A television deflection apparatus, comprising:
 a deflection resonant circuit including a deflection winding and a retrace capacitance;

a source of an input first signal at a frequency that is related to a first deflection frequency;

a first transistor operating as a switch and being responsive to said input first signal and being coupled to said deflection resonant circuit for generating a deflection current in said deflection winding at said first deflection frequency;

a second transistor coupled to said deflection resonant circuit and to said first transistor such that during a given deflection cycle said first and said second transistors are conductive and coupled in series;

a source of an input supply voltage coupled to said first and second transistors for generating a current that flows through both transistors when both transistors are conductive and coupled in series;

a source of a modulation second signal coupled to said second transistor for modulating conduction thereof in accordance with said second signal; and means for generating a control signal that is coupled to a control terminal of said second transistor for substantially reducing the flow of said current through both transistors when said first transistor is conductive.

2. An apparatus according to claim 1 wherein said control signal generating means comprises a source of an on/off control signal.

3. An apparatus according to claim 1 wherein said control signal generating means comprises a remote control receiver.

4. An apparatus according to claim 1 wherein said control signal generating means is responsive to said current that flows in said second transistor for generating said control signal when a magnitude of said current that flows in said second transistor becomes larger than a predetermined magnitude.

5. An apparatus according to claim 1 wherein said deflection resonant circuit comprises a horizontal deflection resonant circuit and wherein said modulation second signal varies in a vertical rate parabolic manner to provide East-West pincushion correction.

6. An apparatus according to claim 1 further comprising a second retrace capacitance that is coupled in series with said first retrace capacitance wherein said first transistor switch has a corresponding main current conducting terminal that is coupled between said first and second retrace capacitances.

7. An apparatus according to claim 6 wherein said second transistor has a corresponding main current conducting terminal that is coupled between said first and second retrace capacitances.

8. An apparatus according to claim 7 wherein said second transistor operates as a switch to form a low impedance across said second retrace capacitance during a portion of a retrace interval having a length that varies in accordance with said modulation second signal.

9. An apparatus according to claim 1 wherein said control signal generating means comprises a resistance that is coupled in series with said first and second transistors.

10. An apparatus according to claim 1 wherein said control signal generating means provides an over-current protection.

11. A television deflection apparatus that includes a protection arrangement, comprising:
a deflection resonant circuit including a deflection winding and a retrace capacitance;

a source of an input first signal at a frequency that is related to a first deflection frequency;

a first inductance;

a first transistor switch responsive to said input signal and coupled to said deflection resonant circuit and to said first inductance for generating a deflection current in a given deflection cycle in said deflection winding and for generating a first retrace pulse voltage in said first inductance during a retrace interval of said given deflection cycle;

a second transistor coupled to said resonant circuit and to said first transistor switch such that during a portion of a given deflection cycle said first and said second transistors are coupled in series;

a source of a modulation second signal coupled to said second transistor for modulating conduction thereof in accordance with said second signal; and switching means having a first terminal that is coupled between said first and second transistors and a second terminal, where a first predetermined voltage level is developed, for coupling a main current conducting terminal of said second transistor to said second terminal when a second retrace pulse voltage that is developed at said main current conducting terminal of said second transistor exceeds a second predetermined voltage level indicative of an overvoltage condition.

12. An apparatus according to claim 11 wherein said first and second predetermined voltage levels are determined in accordance with said first retrace pulse voltage to prevent said over voltage condition from occurring in said second transistor such that during normal operation said second retrace pulse voltage is unaffected by said switching means.

13. an apparatus according to claim 11 wherein said second terminal is coupled between end terminals of said first inductance.

14. An apparatus according to claim 11 wherein said switching means comprises a diode and wherein said first inductance comprises a primary winding of a flyback transformer.

15. A television deflection apparatus with a protection arrangement, comprising:
a source of a first input signal at a frequency that is related to a first deflection frequency;

a retrace resonant circuit, including a deflection winding and a first retrace capacitance;

a first switching transistor responsive to said first input signal and coupled to said retrace resonant circuit for generating a deflection current in said deflection winding and a first retrace pulse voltage in said first retrace capacitance during a retrace interval of a given deflection cycle;

a second retrace capacitance coupled to said retrace resonant circuit for generating in said second retrace capacitance a second retrace pulse voltage during said retrace interval;

a source of an input supply voltage;

a load circuit;

a supply inductance coupled to said source of input supply voltage and to said first switching transistor for coupling said first and second retrace pulse voltages therethrough to said load circuit and for replenishing energy losses in said retrace resonant circuit during said retrace interval;

a source of a modulation second input signal at a frequency that is related to a second deflection frequency;

a second switching transistor responsive to said first and second input signals and having a main current conducting terminal that is coupled to said second retrace capacitance for varying, in accordance with said second input signal, a time difference between initiation of said second retrace pulse voltage and initiation of said first retrace pulse voltage to produce a modulation of said deflection current; and means responsive to a current that flows in said second switching transistor for generating a control signal that is coupled to said second switching transistor for reducing a conductivity of said second switching transistor when said current in said second switching transistor exceeds a predetermined magnitude to provide an over-current protection.

16. A television deflection apparatus with a protection arrangement, comprising:

a source of a first input signal at a frequency that is related to a first deflection frequency;

a retrace resonant circuit, including a deflection winding and a first retrace capacitance;

a first switching transistor responsive to said first input signal and coupled to said retrace resonant circuit for generating a deflection current in said deflection winding and a first retrace pulse voltage in said first retrace capacitance during a retrace interval of a given deflection cycle;

a second retrace capacitance coupled to said retrace resonant circuit for generating in said second retrace capacitance a second retrace pulse voltage during said retrace interval;

a source of an input supply voltage;

a load circuit;

a supply inductance coupled to said source of input supply voltage and to said first switching transistor for coupling said first and second retrace pulse voltages therethrough to said load circuit and for replenishing energy losses in said retrace resonant circuit during said retrace interval;

a source of a modulation second input signal at a frequency that is related to a second deflection frequency;

a second switching transistor responsive to said first and second input signals and having a main current conducting terminal that is coupled to said second retrace capacitance for varying, in accordance with said second input signal, a time difference between initiation of said second retrace pulse voltage and initiation of said first retrace pulse voltage to produce a modulation of said deflection current; and a source of an on/off control signal coupled to a control terminal of said second switching transistor for disabling the generation of said deflection current by rendering said second switching transistor nonconductive during a power-off mode of operation and for enabling the generation of said deflection current by enabling the switching operation of said second switching . transistor switching during a power-on mode of operation.

17. A television deflection apparatus with a protection arrangement, comprising:

a source of a first input signal at a frequency that is related to a first deflection frequency;

a retrace resonant circuit, including a deflection winding and a first retrace capacitance;

a first switching transistor responsive to said first input signal and coupled to said retrace resonant circuit for generating a deflection current in said deflection winding and a first retrace pulse voltage in said first retrace capacitance during a retrace interval of a given deflection cycle;

a second retrace capacitance coupled to said retrace resonant circuit for generating in said second retrace capacitance a second retrace pulse voltage during said retrace interval;

a source of an input supply voltage;

a load circuit;

a supply inductance coupled to said source of input supply voltage and to said first switching transistor for coupling said first and second retrace pulse voltages therethrough to said load circuit and for replenishing energy losses in said retrace resonant circuit during said retrace interval;

a source of a modulation second input signal at a frequency that is related to a second deflection frequency;

a second switching transistor having a control terminal that is responsive to said first and second input signals and a main current conducting terminal that is coupled to said second retrace capacitance for varying, in accordance with said second input signal, a time difference between initiation of said second retrace pulse voltage and initiation of said first retrace pulse voltage to produce a modulation of said deflection current; and a diode having a first terminal that is coupled between said first and second switching transistors and a second terminal that is coupled to a terminal of said supply inductance for preventing a retrace pulse voltage that is developed at a junction terminal between said first and second switching transistors from exceeding a predetermined level so as to provide an over-voltage protection.

18. A television deflection apparatus, comprising:

a deflection resonant circuit including a deflection winding and a retrace capacitance;

a source of an input first signal at a frequency that is related to a first deflection frequency;

means responsive to said input first signal and being coupled to said deflection resonant circuit for generating a deflection current in said deflection winding at said first deflection frequency;

a remote receiver for generating an on/off control signal;

a source of a modulation second signal;

a side pincushion correction circuit responsive to said second signal and coupled to said deflection current generating means for modulating said deflection current to provide side pincushion correction, said side pincushion correction circuit being responsive to said on/off control signal for disabling the operation of said side pincushion correction circuit to prevent the generation of said deflection current and place said deflection apparatus in a standby state.

* * * * *